United States Patent
Chayes et al.

(10) Patent No.: US 8,595,204 B2
(45) Date of Patent: Nov. 26, 2013

(54) SPAM SCORE PROPAGATION FOR WEB SPAM DETECTION

(75) Inventors: Jennifer T. Chayes, Seattle, WA (US); Christian H. Borgs, Seattle, WA (US); Krishna Chaitanya Gade, Redmond, WA (US); John E. Hopcroft, Ithaca, NY (US); Seyed Vahab Mirrokni, Seattle, WA (US); Amit Prakash, Bellevue, WA (US); Tao Tao, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 888 days.

(21) Appl. No.: 11/865,045

(22) Filed: Sep. 30, 2007

(65) Prior Publication Data

US 2008/0222135 A1   Sep. 11, 2008

Related U.S. Application Data

(60) Provisional application No. 60/893,052, filed on Mar. 5, 2007.

(51) Int. Cl.
G06F 17/30    (2006.01)

(52) U.S. Cl.
USPC .......................................... 707/706

(58) Field of Classification Search
None
See application file for complete search history.

(56) References Cited

U.S. PATENT DOCUMENTS

| | | | |
|---|---|---|---|
| 7,051,077 B2 | 5/2006 | Lin | |
| 7,464,264 B2 | 12/2008 | Goodman et al. | |
| 2003/0220912 A1 | 11/2003 | Fain et al. | |
| 2004/0267686 A1* | 12/2004 | Chayes et al. | 707/1 |
| 2005/0015626 A1 | 1/2005 | Chasin | |
| 2005/0060297 A1 | 3/2005 | Najork | |
| 2006/0004748 A1 | 1/2006 | Ramarathnam et al. | |
| 2006/0020672 A1 | 1/2006 | Shannon et al. | |
| 2006/0069667 A1 | 3/2006 | Manasse et al. | |
| 2006/0080059 A1* | 4/2006 | Stupp et al. | 702/120 |
| 2006/0095416 A1 | 5/2006 | Barkhin et al. | |
| 2006/0149821 A1 | 7/2006 | Rajan et al. | |
| 2006/0155751 A1* | 7/2006 | Geshwind et al. | 707/102 |
| 2006/0184500 A1 | 8/2006 | Najork et al. | |
| 2006/0294155 A1 | 12/2006 | Patterson | |
| 2007/0011323 A1 | 1/2007 | Gaal | |
| 2007/0038600 A1 | 2/2007 | Guha | |
| 2007/0067282 A1 | 3/2007 | Prakash et al. | |
| 2007/0239694 A1* | 10/2007 | Singh et al. | 707/3 |

(Continued)

FOREIGN PATENT DOCUMENTS

WO    WO2006036170 A1    4/2006

OTHER PUBLICATIONS

Carlos Castillo, et al. Know your Neighbors: Web Spam Detection using the Web Topology. Draft version, updated: Nov. 23, 2006. http://www.dcc.uchile.cl/~ccastill/papers/cdgms_2006_know_your_neighbors.pdf. Last accessed Apr. 20, 2007.

(Continued)

*Primary Examiner* — Hosain Alam
*Assistant Examiner* — Johnese Johnson
(74) *Attorney, Agent, or Firm* — Lee & Hayes, PLLC

(57) ABSTRACT

A SPAM detection system is provided. The system includes a graph clustering component to analyze web data. A link analysis component can be associated with the graph clustering component to facilitate SPAM detection in accordance with the web data.

19 Claims, 9 Drawing Sheets

(56) References Cited

U.S. PATENT DOCUMENTS

| | | | |
|---|---|---|---|
| 2008/0082481 A1* | 4/2008 | Joshi et al. | 707/2 |
| 2008/0140781 A1 | 6/2008 | Bocharov et al. | |
| 2008/0147669 A1 | 6/2008 | Liu et al. | |
| 2008/0195631 A1 | 8/2008 | Dom et al. | |
| 2009/0094342 A1 | 4/2009 | Leiba et al. | |

OTHER PUBLICATIONS

Luca Becchetti, et al. Link Analysis for Web Spam Detection. AIRWeb 2006. WebKDD 2006. IST-015964 AEOLUS. Last updated: Mar. 22, 2007. http://www.dcc.uchile.cl/~ccastill/papers/becchetti_2007_link_analysis_web_spam_detection.pdf. Last accessed Apr. 20, 2007.

David Gibson, et al. Discovering Large Dense Subgraphs in Massive Graphs. 31st VLDB Conference, Trondheim, Norway, 2005. http://www.vldb2005.org/program/paper/thu/p721-gibson.pdf. Last accessed Apr. 20, 2007.

Kumar, et al., "The Web as a Graph", In the Proceedings of the Nineteenth ACM SIGMOD-SIGACT-SIGART Symposium on Principles of Database Systems, May 2000, pp. 1-10.

Office Action for U.S. Appl. No. 11/865,044, mailed on Apr. 15, 2011, Jennifer T. Chayes, "Graph Structures and Web Spam Detection".

* cited by examiner

SPAM SCORE PROPAGATION FOR WEB SPAM DETECTION

CROSS REFERENCE TO RELATED APPLICATION

This application claims the benefit of U.S. Provisional Patent Application Ser. No. 60/893,052 filed on Mar. 5, 2007, entitled "GRAPH STRUCTURES AND WEB SPAM DETECTION" the entirety of which is incorporated herein by reference.

BACKGROUND

In general, when searching for information with a search engine, the number of web pages that can reasonably be returned as relevant in a given search is far too large for a human user to digest. To provide effective search methods under these conditions, methods are needed to filter from a huge collection of relevant pages, a small set of the most authoritative or definitive ones. Search engines use the link structure of a web graph to rank the importance of web pages and their relevance to a particular subject in order to facilitate the filtering process. Two of the best-known algorithms for this purpose are the page-rank algorithm and the hubs and authorities algorithm. The page-rank is the algorithm used by the Google search engine, and was originally formulated by Sergey Brin and Larry Page in their paper "The Anatomy of a Large-Scale Hypertextual Web Search Engine." It is based on the premise, prevalent in the world of academia, that the importance of a research paper can be judged by the number of citations the paper has from other important research papers. Brin and Page have simply transferred this premise to its web equivalent—the importance of a web page can be judged by the number of hyperlinks pointing to it from other web pages.

The page-rank of a web page is calculated as a linear combination of two terms: (i) the sum of the page rank of each page linking to it divided by the number of links on that page, and (ii) a constant term, referred to as random restart. From a search engine marketer's point of view, this implies there are two ways in which page rank can affect the position of a page. First, the number of incoming links. Clearly, the more incoming links one has the better ranking that can be received. There is also another aspect that the algorithm informs: no incoming link can have a negative effect on the page rank of the page it points at. At worst, it can simply have no effect at all. Secondly, the number of outgoing links on the page which points at a given page affects the ranking of the latter. In other words, the ranking of a page increases if the pages pointing to it have fewer outgoing links. This implies that given two pages of equal page rank linking to a respective page, one with outgoing links and the other with 10, one will get twice the increase in page rank from the page with only 5 outgoing links. These known aspects of the algorithm can be exploited by web spammers however to artificially increase the popularity of their respective web pages.

Similarly, the hubs and authorities algorithm can be exploited. In general, Hyperlinks encode a considerable amount of latent human judgment. By creating links to another page, the creator of that link has "conferred authority" on the target page. Links afford the opportunity to find potential authorities purely through the pages that point to them. Generally, this algorithm model is based on the relationship that exists between the authorities for a topic and those pages that link to many related authorities, where pages of this latter type are referred to as hubs.

Web spammers have learned how to exploit the link structure employed by ranking algorithms to improve their rank in search engines. The main method to detect web spam is based on the content of the web pages. But this is very costly in terms of processing time. Moreover, if web pages are ranked for the purpose of giving priority during the crawling stage, some information should be extracted about the web spam without yet having complete information on the content of the pages. Hence, methods are needed to detect web spam in an efficient manner and based on the link structure.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Link analysis and graph clustering are employed for web spam detection and to facilitate the accuracy of search engine ranking, where various processes can be utilized for detection. If initial spam scores for at least some of the pages are known, one type of processing can be applied whereas another type of processing can be utilized in the absence of initial spam information. In the first processing approach, the process starts from some initial spam scores for a subset of nodes in a graph and uses graph structures to (i) discover the spam score of other nodes, and (ii) improve the spam score of the nodes for which some initial spam score is available. In the second processing approach to spam detection, the process derives information solely from the graph structure, without starting from some initial spam scores. In this case, nodes can be clustered based on some local structures around them, and then attempts to identify structures that are indicative of spam. As a result, without starting from some initial spam scores, suspicious nodes can be detected in the graph, and can then be investigated further. Generally, detecting spam scores starting from some initial spam scores fits in the area of supervised learning theory, while the second approach fits in the area of unsupervised learning theory. Supervised and unsupervised learning algorithms for spam detection can be employed.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

A web spam detection system is provided. The system includes graph processing components to analyze web data. The processing components include a global partitioning component, a local neighborhood clustering component, and iterative components to facilitate spam detection in accordance with the web data.

As used in this application, the term "component," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
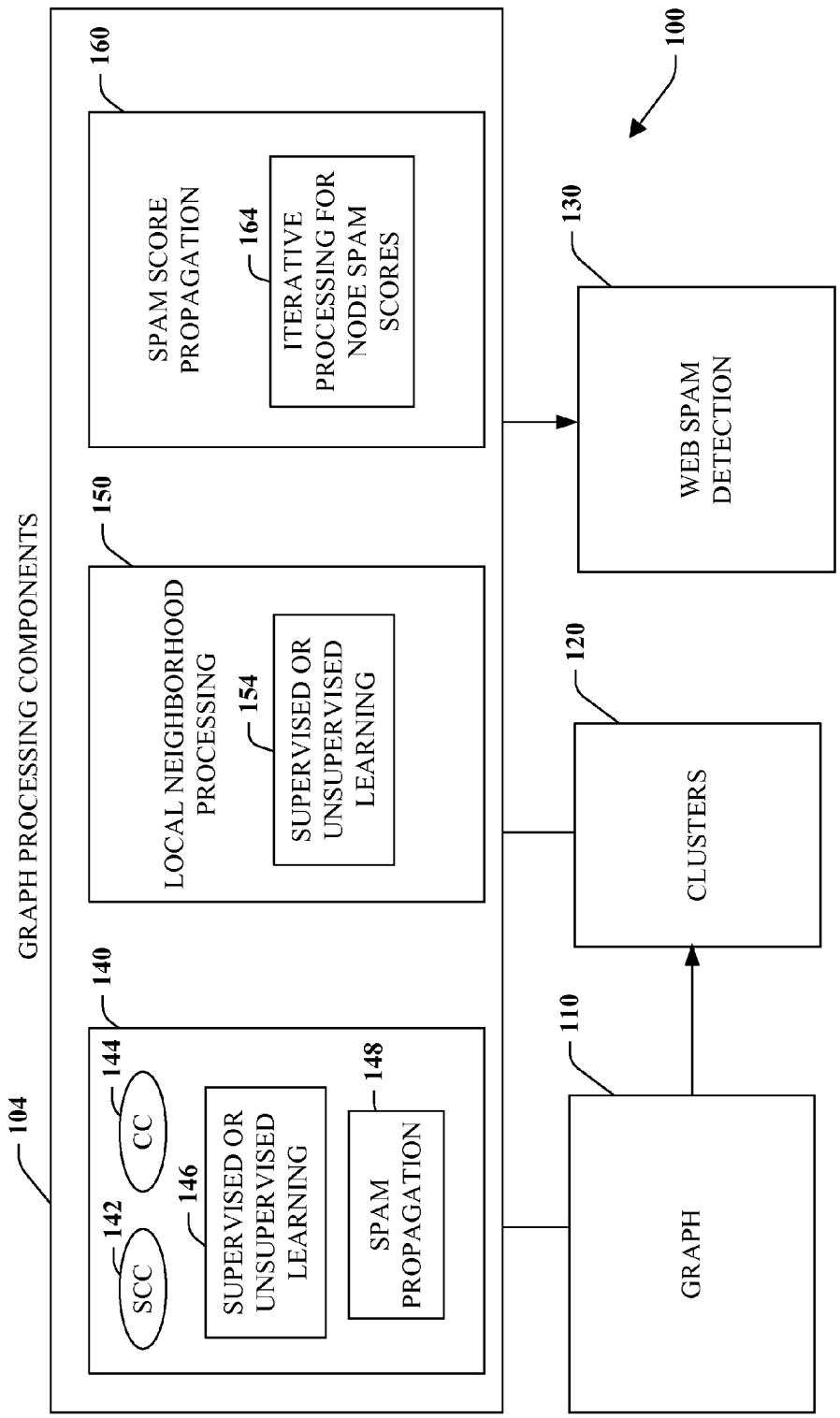
FIG. 1 is a schematic block diagram illustrating a spam detection system.

Referring initially to FIG. 1, a spam detection system 100 is illustrated. The system 100 includes a graph processing component 104 that analyzes and processes a graph 110 into one or more clusters of data 120, wherein the respective clusters and graph are employed to detect Web Spam 130. The graphs 110 can include various forms such as domain graphs, weighted domain graphs, diluted domain graphs, and full web graphs which are described in more detail below with respect to FIG. 2. At least three classes of methods, algorithms, or components are provided by the graph processing components 104 to detect the Web Spam 130.

In one aspect, a processing component 140 employs a strongly connected component (SCC) 142 and a connected component (CC) 144 to classify pages according to whether they belong to the largest SCC, the largest CC, whether they have directed path from, or directed path to the largest SCC. This leads to a feature vector, which can then be used for supervised or unsupervised learning at 146. The output of the supervised or unsupervised learning can be used as initial scores in a spam propagation component 148, where the scores are employed to predict which pages are suspected of spam and which are not (e.g., higher scores above a threshold predicating spam).

In another aspect, a local neighborhood processing component 150 determines local neighborhoods that include vertices which contribute toward a page rank of a given vertex— v. The features of this local neighborhood are then employed for supervised or unsupervised learning of spam scores at 154. To determine the vertices v, the component 150 can (i) propose vertices w which may contribute toward the page rank of the vertex v, and determine when to include a proposed vertex w into the local neighborhood. An absolute threshold for the personalized page rank of v can be utilized, starting from w, or a relative threshold, relative to the standard (non-personalized) page rank of v. To determine local neighborhood clusters, a standard backward random walk can be employed, or a backward random walk where small probabilities are pruned, in a similar manner to the standard Spielman-Teng algorithm.

For unsupervised learning at 154, the component 150 can test whether the local neighborhood of v has just been created to give v large page rank, or whether it is an "organic" local neighborhood, which yields a large page rank to many pages. One test involves the ratio of the number of edges pointing out of the local neighborhood divided by the size of the local neighborhood, for example. More generally, various features of the local neighborhood are considered to determine spam scores. With respect to supervised learning at 154, the local neighborhood of a node $v$ is processed, where the percentage of spam nodes is processed to non-spam nodes in this neighborhood. Using some initial labels for spam and non-spam, if the percentage of spam nodes over non-spam nodes in the neighborhood is large, then the page is more suspicious and a determination should inspect if the node is spam or not (e.g., compare score to threshold).

In still yet another aspect, spam score propagation is provided at 160. Using some initial spam and non-spam scores, the component 160 iteratively applies local effects and updates spam and non-spam scores for one or more nodes. For example, if a node links to many nodes with high spam scores, the node is deemed suspicious, thus its spam score can be increased. On the other hand, if most of incoming links of a node originate from nodes with low page rank, its spam score can be decreased. If these operations are applied iteratively at 164, the spam scores can be propagated throughout the graph 110 to provide more accurate spam scores for unlabeled nodes.

In other aspects, fast global graph partitioning components or algorithms can be employed by the graph partitioning components 104 to show a correlation between given spam scores and the resulting clusters 120. In particular, strongly connected components 142 and connected components 144 can be utilized to partition the graph 110 into several clusters 120, and use the resultant cluster information in a supervised or unsupervised learning 146 to detect web spam 130. In another aspect, the local neighborhood clustering component 150 is employed to cluster nodes of the graph 110 based on the shape of a determined local neighborhood around each node. This can be used both in supervised and unsupervised learning 154, for example. In yet another processing aspect, natural iterative algorithms or components 160 are applied to propagate spam scores among nodes of the graph 110, as well as utilizing these algorithms to improve the spam score of nodes.

In general, link analysis and graph clustering are employed by the graph processing components 104 for web spam detection 130 and to facilitate the accuracy of search engine ranking, where various processes can be utilized for detection. If initial spam scores for at least some of the web pages are known, one type of processing can be applied whereas another type of processing can be utilized in the absence of initial spam information. In the graph partitioning approach at 140, the process starts from some initial spam scores for a subset of nodes in the graph 110 and uses graph structures to (i) discover the spam score of other nodes, and (ii) improve the spam score of the nodes for which some initial spam score is available. In the local neighborhood approach 150 to spam detection 130, the process derives information from the graph structure 110, without starting from some initial spam scores. In this case, nodes can be clustered based on some local structures around them, and then attempts to identify structures that are indicative of spam. As a result, without starting from some initial spam scores, suspicious nodes can be detected in the graph 110, and can then be investigated further for web spam. Generally, detecting spam scores starting from some initial spam scores fits in the area of supervised learning theory, while the second approach fits in the area of unsupervised learning theory. Supervised and unsupervised learning algorithms for spam detection can be employed.

In another aspect, a web spam detection system is provided. The system includes means for segmenting a graph into one or more clusters (global graph partitioning 140) and means for processing the graph to determine the clusters (graph processing components 104). This also includes means for performing neighborhood processing on the graph to detect web spam associated with the graph (local neighborhood clustering component 150).

Figure 2:
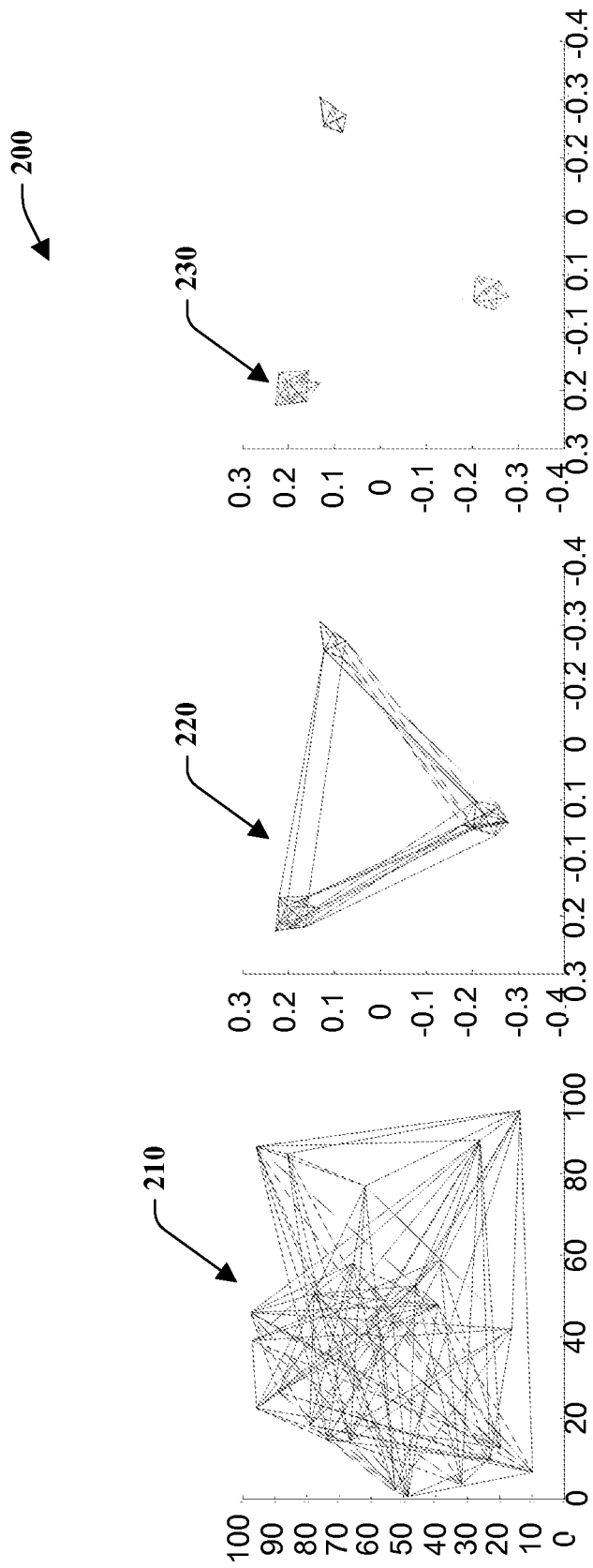
FIG. 2 is a diagram illustrating example graph processing concepts

Referring now to FIG. 2, an example graph 200 and resultant processing is illustrated. At 210, a graph illustrates an un-clustered graph. At 220, graph clustering is shown using SVD clustering. A neighborhood is illustrated at 230. In one aspect, the above described algorithms and components can be applied to a domain graph of the web but other type graphs are possible. Each node of the graph 210 corresponds to a domain name on the web. There is an edge from one domain to another domain if there is any edge from any web page inside the first domain to any web page in the second domain. For the purpose of supervised learning, an initial spam score is given, between 0 and 1, for each of about 30 million nodes of the graph. A high spam score indicates that the domain probably has a substantial amount of web spam.

The link structure of the graph 210 is employed to detect domains that may contain large amounts of web spam. The graph 210 can be partitioned with various clustering algorithms to determine the correlation between various clusters and the likelihood of spam. The given spam scores are used to evaluate algorithms empirically. In supervised learning approaches, the algorithms start from the given set of initial spam scores and then exploit the link structure to improve the spam score of these nodes to determine the spam score of other nodes.

There several other graphs for which the methods described below, or variations thereof, can also be applied, e.g.,
- weighted domain graphs, where two domains are linked by an edge weighted by the number of links between the two domains;
- diluted domain graphs, where an edge is placed between two domains if they are linked by more than T links, with the threshold T being an arbitrary parameter;
- the full web graph itself, possibly after some preprocessing;

For simplicity of explanation, the methods described below are described for the domain graph but it is to be appreciated that other graph types are possible.

Figure 3:
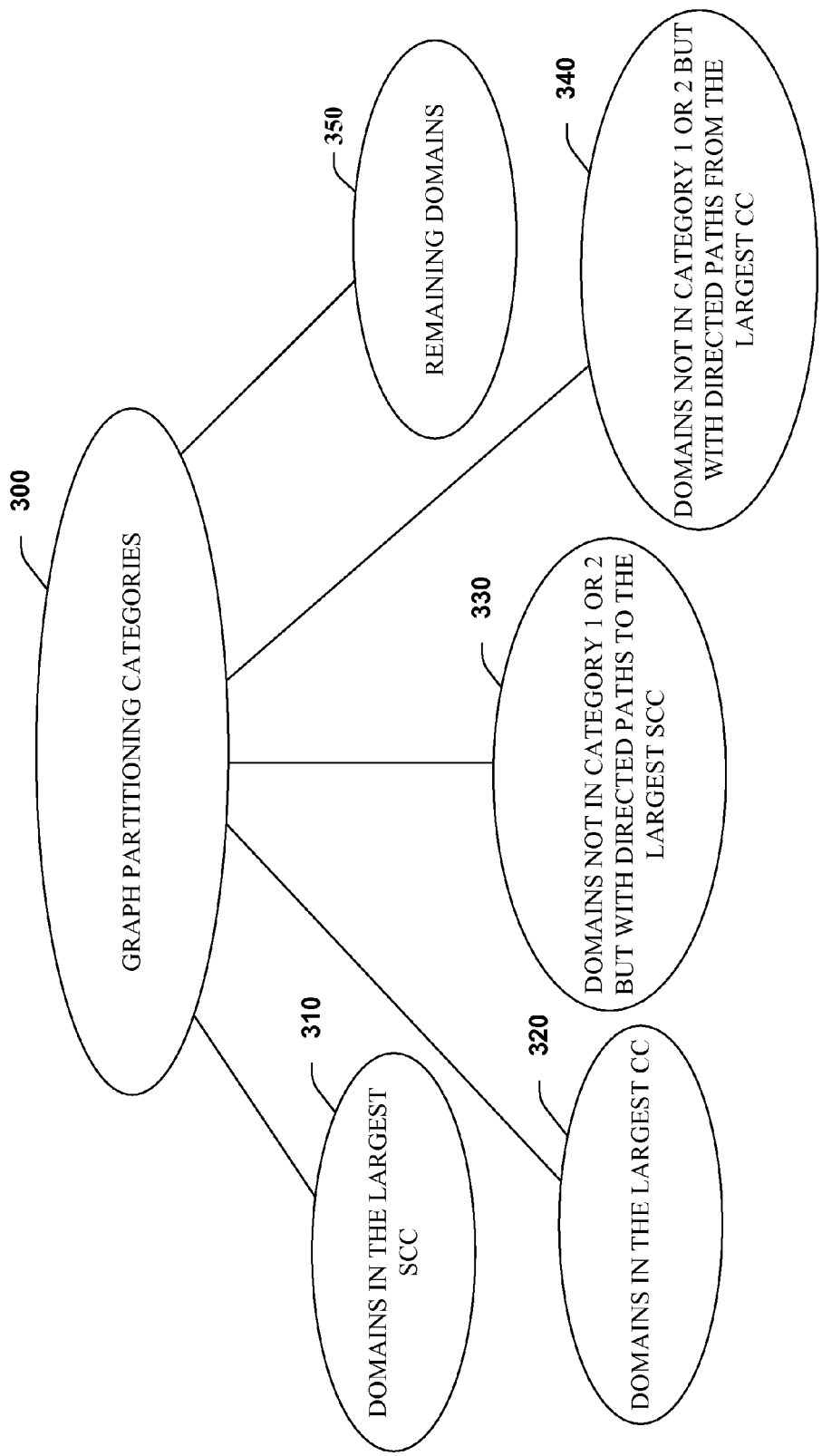
FIG. 3 illustrates example graph partitioning categories.

Turning to FIG. 3, example graph partitioning categories 300 are described. In this aspect, fast global partitioning algorithms can be applied to cluster the graph and find relationships between clusters and spam score of domains. In particular, strongly connected components of the domain graph are located and connected components of the underlying undirected graph.

For the example domain graph, large strongly connected component and several small connected components were observed. Also, the underlying undirected graph has a very large connected component and many very small connected components. The vertices of the graph are divided into five categories. In the following, SCC indicates a strongly connected component, and CC indicates connected components.

Category 1 at 310: Domains in the largest SCC.
Category 2 at 320: Domains not in the largest CC.
Category 3 at 330: Domains not in categories 1 or 2, but with directed paths to the largest SCC.
Category 4 at 340: Domains not in categories 1 or 2, but with directed paths from the largest SCC to them.
Category 5 at 350: The remaining domains.

Figure 4:
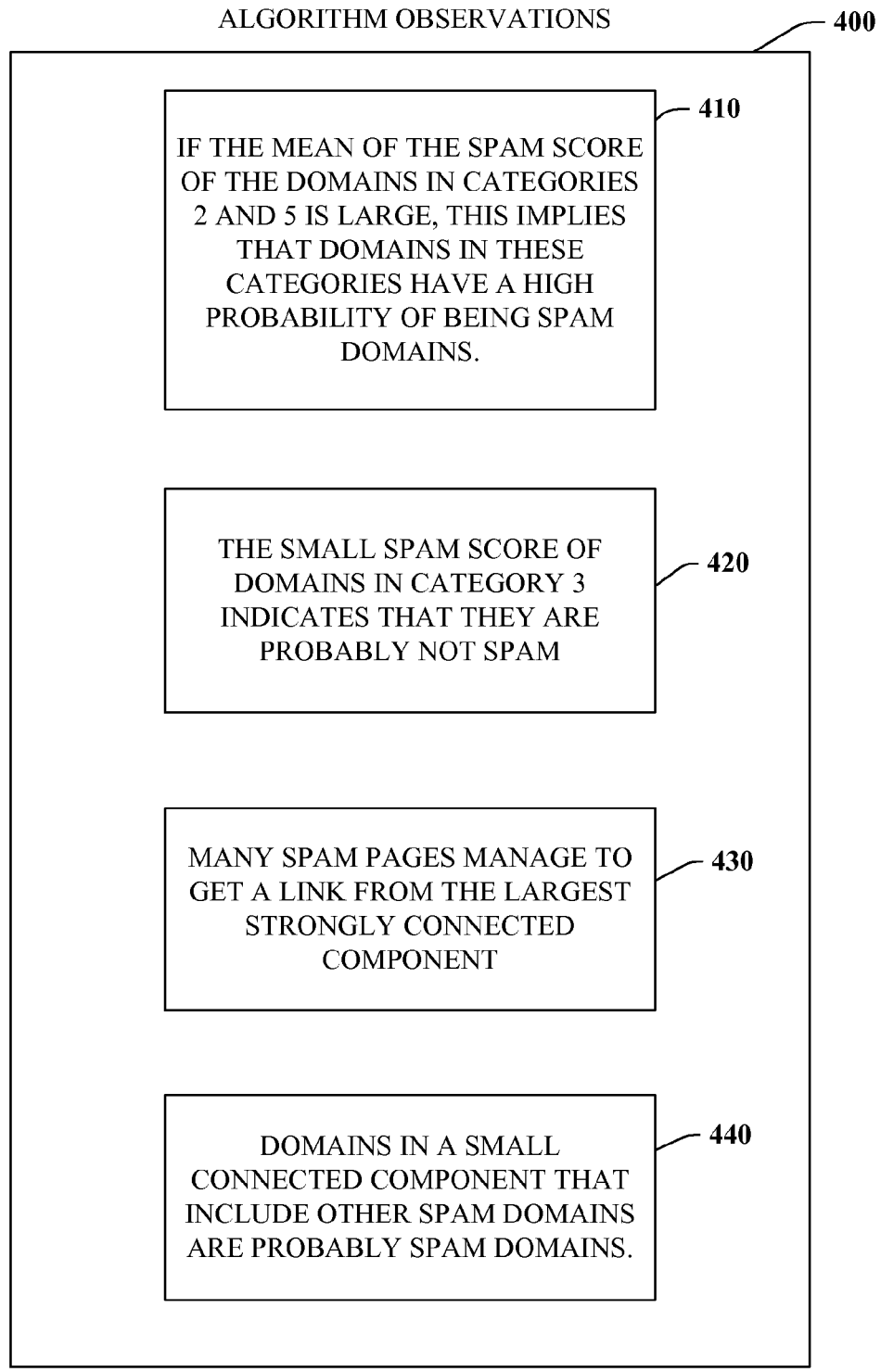
FIG. 4 illustrates example algorithmic observations employed to detect web spam.

The table below summarizes some of the observations from the example domain graph. The first column is the category number, as described above. The second column is the number of vertices in that category. The third column is the number of vertices in that category for which there was an initial spam score. The fourth column is the mean of the spam score of the domains in each category. The last column is the variance of the spam score in each category. FIG. 4 describes algorithm observations for processing these respective examples.

| 1 | 13417192 | 13417192 | 0.161172433628004 | 0.0372651835676777 |
| 2 | 11567325 | 35491 | 0.231641524893636 | 0.0546585767936068 |
| 3 | 6536034 | 6536034 | 0.104360480498998 | 0.0319579777683641 |
| 4 | 20956015 | 534548 | 0.188712482931401 | 0.044499010434684 |
| 5 | 3077585 | 178277 | 0.249243528424874 | 0.0626159606401741 |

Referring to FIG. 4, example algorithm observations 400 for processing graphs are provided. The observations 400 are employed to infer rules and algorithms for detecting web spam. At 410, observation 1 is described where the mean of the spam score of the domains in categories 2 and 5 (from FIG. 3) is large, implying that domains in these categories have a high probability of being spam domains. At 420, an observation 2 provides where the small spam score of domains in category 3 indicates that they are probably not spam.

Observations 1 and 2 suggest that, if a feature vector is constructed containing relevant information on each domain, then that feature vector could contain entries corresponding to (a) whether the domains are in categories 2 or 5 (if so, they have a higher probability of being spam), and (b) whether the domains are in category 3 (if so, they have a lower probability of being spam).

At 430, an observation 3 provides that many spam pages manage to get a link from the largest strongly connected component, since the mean of the spam score of category 4 is not small—and, in fact, larger than other categories. This implies that many spam pages get a link from the large SCC, but do not send an edge or path back to the large SCC (perhaps in an attempt to increase their page-rank by creating a trap for random walkers). At 440, an observation 4 provides that domains in a small connected component that include other spam domains are probably spam domains. This intuitive observation is not inferred from the above table, but from other data investigations. Observation 4 can be used for a supervised learning method to detect web spam as follows: if a domain is in a small connected component with many spam domains, this domain is also probably web spam. Again, a feature vector could contain an entry corresponding to this observation. The above observations are also useful in assigning initial spam scores to be propagated. For instance, e.g., assign the initial scores to the domains by given scores proportionally to the mean scores of their categories (or as some other increasing function of the mean scores of their categories).

Figure 5:
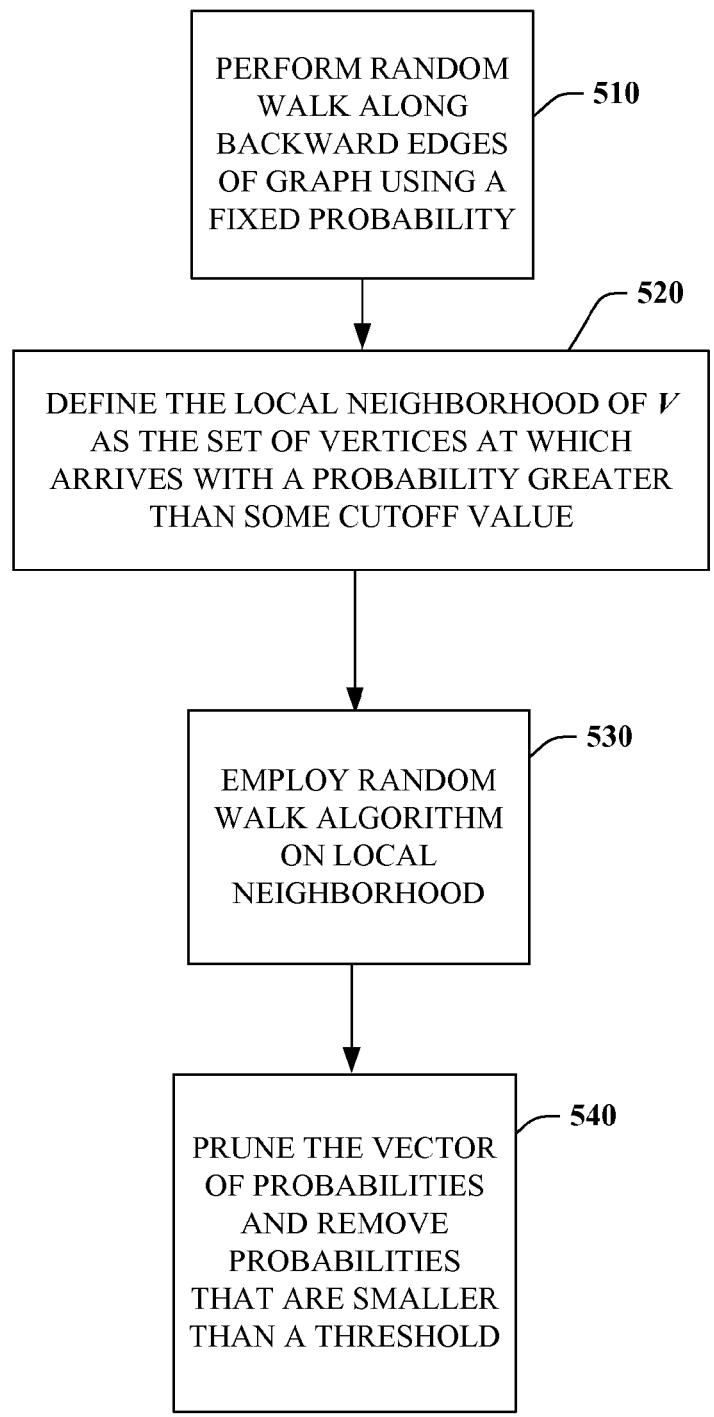
FIG. 5 illustrates an example process to detect local neighborhoods.

Proceeding to FIG. 5, a process 500 is described for finding local neighborhood clustering. In this aspect, local neighborhoods are located around each domain and used for the purpose of supervised and unsupervised learning for spam detection. The local neighborhood of a domain is the set of domains that generally contributes the most to the page-rank of this domain. First, a fast algorithm to find the local neighborhood of a vertex is described. Then how local neighborhood structures are employed to detect web spam is described.

In order to find the local neighborhood of domain v, perform a random walk along backward edges of a graph at 510, using a fixed probability, e.g., 15%, of restarting at the original vertex v. At 520, define the local neighborhood of v as the set of vertices at which arrives with probability greater than some cutoff value. In other words, the local neighborhood of a vertex v is a set of vertices that has high personalized page-rank for v. In order to improve the running time of finding this set of vertices, a refined random walk algorithm is utilized at 530. Proceeding to 540, prune the vector of probabilities and remove probabilities that are smaller than a threshold. Using this process, the algorithm basically need only multiply vectors of smaller values resulting in an improvement of the running time by a large factor.

Figure 6:
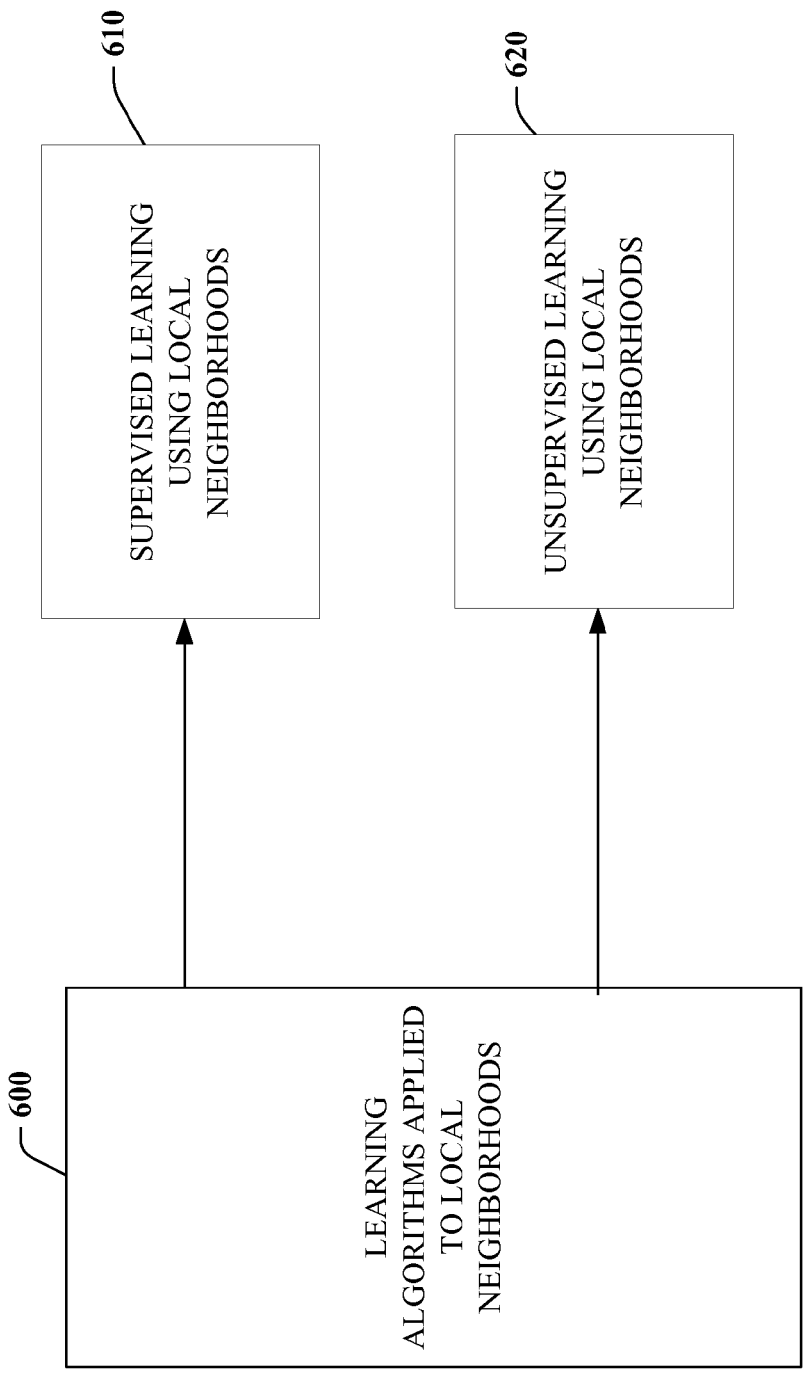
FIG. 6 illustrates supervised and unsupervised learning components to process data from determined local neighborhoods

Referring now to FIG. 6, example learning algorithms 600 are applied to local neighborhoods determined above. At 610, supervised learning models can be applied using local neighborhoods. The local neighborhood structures described above can be employed to improve a set of initial spam scores. If most of the domains that contribute significantly to the page-rank of a given domain have low spam scores, then this domain is probably not a spam domain. This implies that if most of domains in the local neighborhood of a domain have low spam scores, then this domain is probably not a spam domain. Conversely, if most of the domains that contribute significantly to the page-rank of a spam domain have high spam scores, and very few domains of low spam score contribute significantly to the page-rank of this domain, then this domain is probably a spam domain as well. As a result, if the local neighborhood of a domain has a large number of high spam score domains and not many low spam score domains, then this domain is probably also a spam domain.

Proceeding to 620, unsupervised learning components can be employed using Local Neighborhoods. In this aspect, construct a characteristic vector for each domain based on the shape of the neighborhood of this domain, cluster domains based on their characteristic vectors, and mark some clusters as suspicious clusters for web spam detection. The feature vector for each vertex could have the following elements in it:

1) d1, d2, d3, . . . , dk: The number of vertices with shortest path of length 1, 2, 3, . . . , k to v (e.g., d1 is the in-degree of v). Let the union of these vertices be BACK.
2) L: The size of the local neighborhood, N(v), of vertex v.
3) A1: Number of edges from vertex v to vertices outside of N(v).
4) A2: Number of edges from vertex v to vertices outside of BACK.
5) B1: Number of vertices that are not in N(v), but have an edge from a vertex in N(v). Let OUT1 be the set of such vertices.
6) B2: Number of vertices that are not in BACK, but have an edge from a vertex in BACK. Let OUT2 be the set of such vertices.
7) C1: Total number of edges among vertices of N(v).
8) C2: Total number of edges among vertices of BACK.
9) D1: Total number of edges from OUT1 to N(v).
10) D2: Total number of edges from OUT2 to BACK.

With respect to unsupervised learning 620, cluster the domains based on the above feature vector and identify clusters that correspond to domains with large spam score. For example, if A1 and B1 are much smaller than L, this indicates that most of the domains which contribute significantly to the page-rank of v only link to each other (and not to other vertices). This in turn indicates an attempt to increase the page-rank of a vertex by adding a link spam among a closed set of domains. Hence such domains would have a high probability of being spam domains. Note that the clusters of these feature vectors can also be used in supervised learning algorithms.

Figure 7:
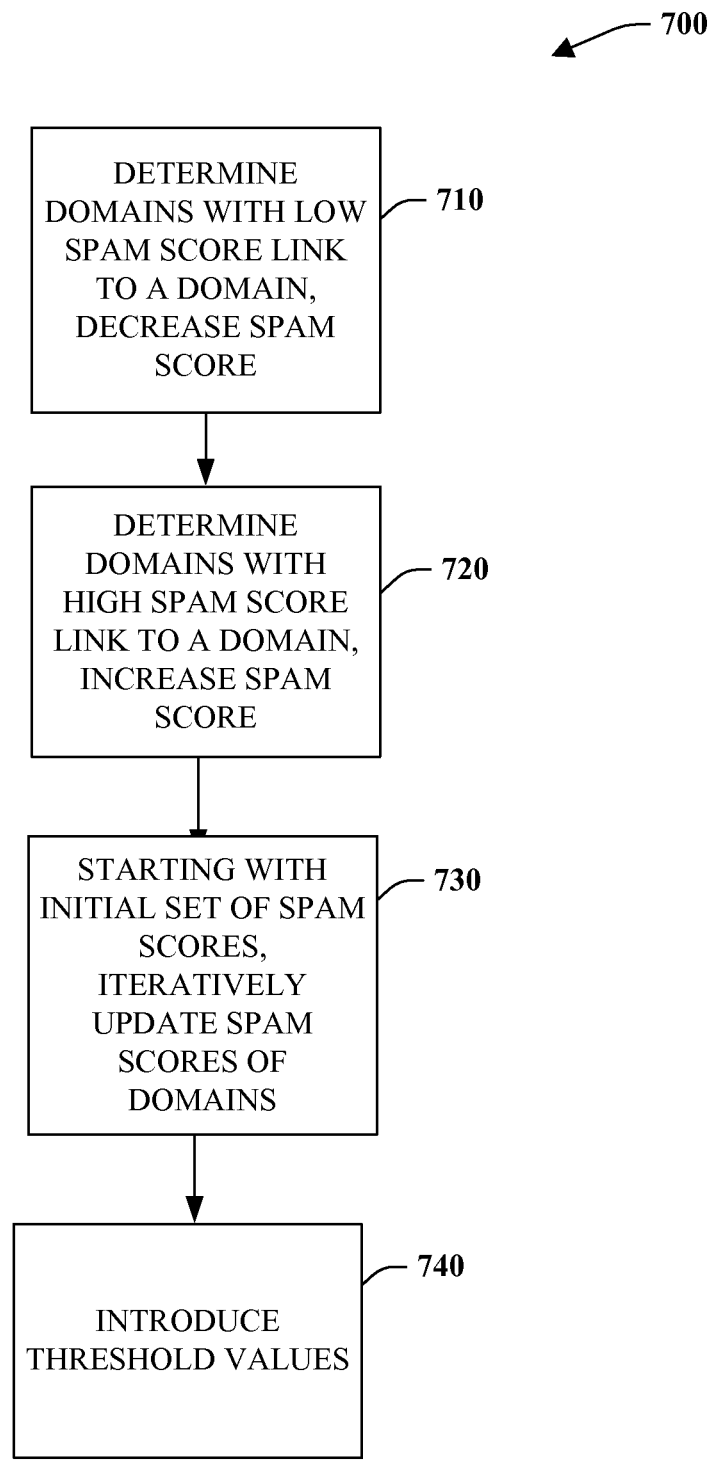
FIG. 7 illustrates an iterative process to detect web spam based upon and initial scoring of nodes.

FIGS. 4 and 7 illustrate exemplary processes for detecting web spam. While, for purposes of simplicity of explanation, the processes are shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Referring now to FIG. 7, a process 700 illustrates iterative processing aspects for spam scores. In this aspect, the process uses the link structure to improve an initial set of spam scores in an iterative manner. This is based in part on the intuition that spam pages need to link to each other to increase their rank in the search engine. The general process is as follows. At 710, if many domains with a very low spam score link to a domain, decrease the spam score of the domain. Conversely at 720, if a domain links to many domains with a high spam score, increase its spam score. At 730, starting from an initial set of spam scores, use these rules at 710 and 720 to iteratively update the spam score of the domains.

In order to make these computations more precise, several threshold values T are introduced at 740—two thresholds for spam scores to be considered "very low" and "high", and two thresholds which determine the two meanings of "many" in the above paragraph. It is to be appreciated that other values can be employed. It useful to define the latter thresholds by considering the absolute and the relative number of in- or out-going links of very low or high spam score, respectively. In general, these threshold-functions can be replaced by other non-linear functions. Another parameter of the algorithm is the number T of updating steps in the algorithm. If T is small, the initial spam scores will not change much, and thus they have a large influence. As T grows, the link structure becomes more and more important in the determination of spam.

Figure 8:
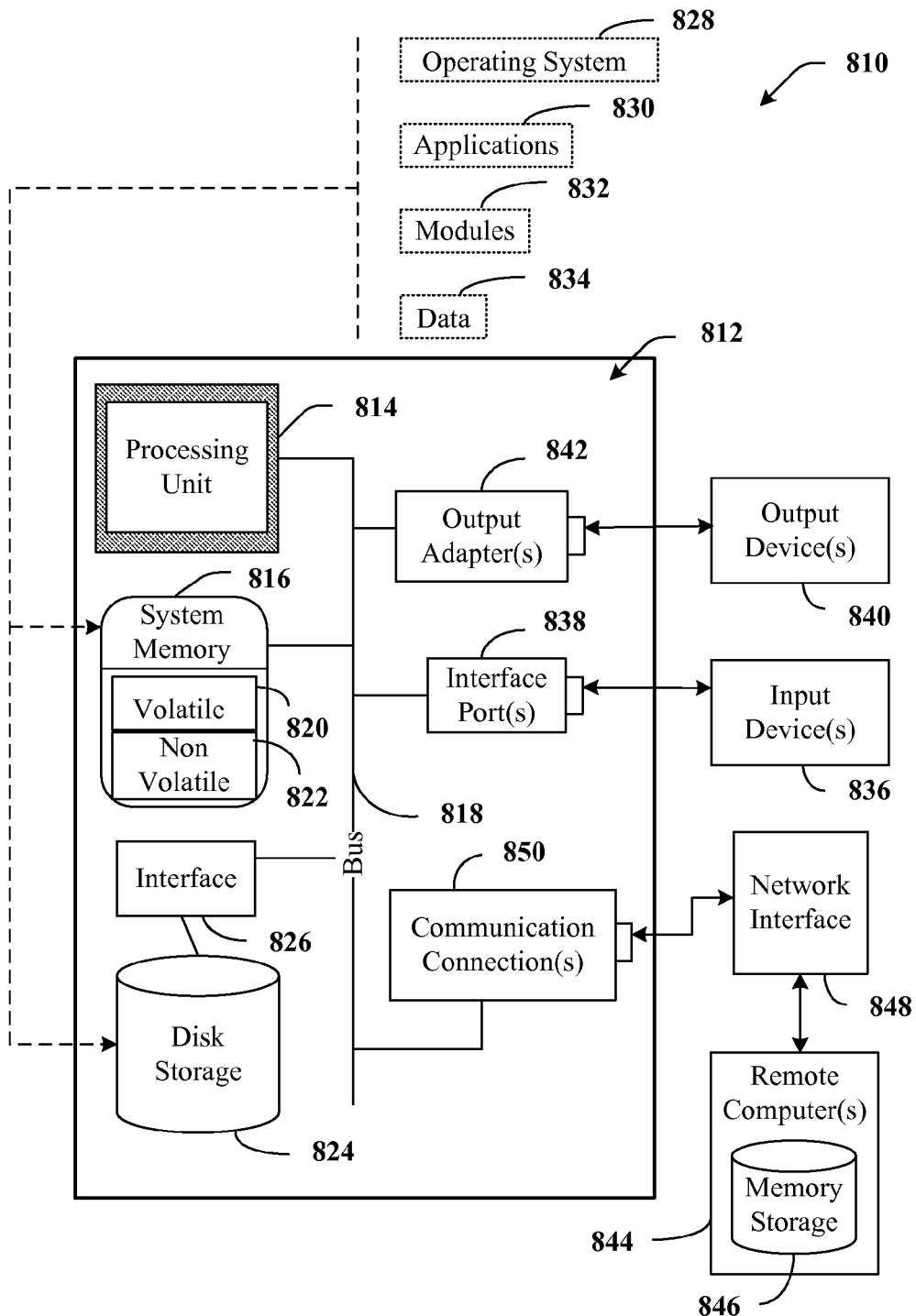
FIG. 8 is a schematic block diagram illustrating a suitable operating environment.
Figure 9:
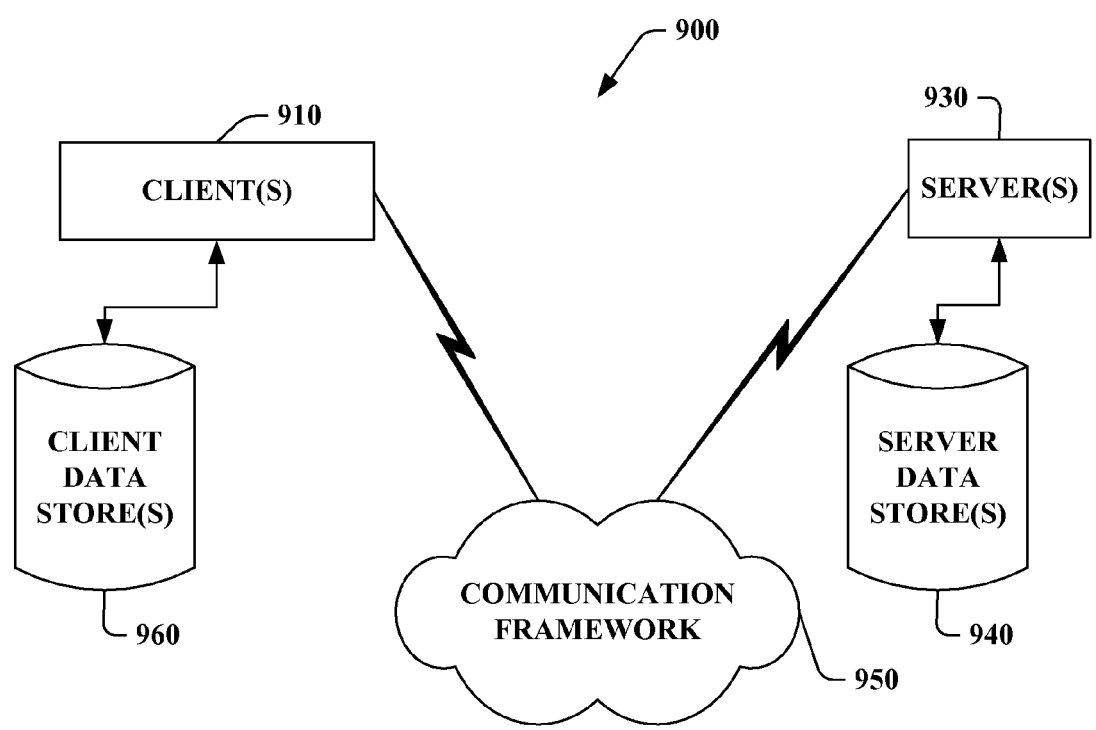
FIG. 9 is a schematic block diagram of a sample-computing environment.

In order to provide a context for the various aspects of the disclosed subject matter, FIGS. 8 and 9 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 8, an exemplary environment 810 for implementing various aspects described herein includes a computer 812. The computer 812 includes a processing unit 814, a system memory 816, and a system bus 818. The system bus 818 couple system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that various components described herein can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812 and to output information from computer 812 to an output device 840. Output adapter 842 is provided to illustrate that there are some output devices 840 like monitors, speakers, and printers, among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 that can be employed. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the components described herein, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented web spam detection system, comprising the following computer components stored in a computer readable media and executable by one or more processors:
    a global graph partitioning component that segments data associated with a graph into clusters, the graph being a diluted domain graph in which each pair of vertices that represent corresponding domains is connected by a corresponding edge when a number of domain links between the vertices exceeds a predetermined threshold;
    a local neighborhood processing component that determines local neighborhoods formed in part by the clusters that include vertices which contribute toward a page rank of a vertex; and
    a learning component that employs features of the local neighborhoods to determine spam scores for web spam detection, the learning component including an unsupervised learning algorithm that makes a determination as to whether a local neighborhood of the vertex is an artificial local neighborhood created to yield a large page rank to a plurality of pages or an organic local neighborhood that naturally yields a large page rank to the plurality of pages, the unsupervised learning algorithm makes the determination based on a ratio of a number of edges of the vertex that point out of the local neighborhood divided by a size of the local neighborhood.

2. The system of claim 1, wherein the learning component further includes a supervised learning component to detect web spam.

3. The system of claim 1, further comprising a component to determine vertices which contribute toward a page rank of a particular vertex, the component further determines when to include a proposed vertex into the local neighborhoods.

4. The system of claim 3, further comprising a component to assign an absolute threshold to a personalized page rank of the particular vertex that starts from the proposed vertex, the absolute threshold being used to determine whether to include the proposed vertex into the local neighborhoods.

5. The system of claim 3, further comprising a component to assign a relative threshold, wherein the relative threshold is relative to a non-personalized page rank of the particular vertex.

6. The system of claim 1, further comprising a component to determine local neighborhood clusters via a backward random walk algorithm.

7. The system of claim 6, wherein the backward random walk algorithm prunes probabilities below a given threshold.

8. The system of claim 1, wherein the learning component includes a supervised learning algorithm that makes the determination based on a percentage of spam nodes over non-spam nodes in the local neighborhood.

9. The system of claim 1, further comprising a component to assign initial labels for spam and non-spam nodes in the local neighborhood.

10. The system of claim 1, further comprising a component to determine a local neighborhood of a particular domain and perform a random walk along backward edges of a graph using a fixed probability.

11. The system of claim 10, wherein the component defines the local neighborhood of the particular domain as a set of vertices at which arrives with probability greater than a given cutoff value.

12. The system of claim 11, further comprising a component to prune a vector of probabilities and remove probabilities that are smaller than a threshold.

13. The system of claim 1, further comprising a supervised learning component to determine spam scores for domains that contribute to a page-rank of a particular domain, wherein each of one or more pages in the particular domain are determined not to be spam when each of the spam scores is below a predetermined threshold.

14. The system of claim 1, further comprising an unsupervised learning component that constructs a characteristic vector for domains based on a shape of a neighborhood of the domain.

15. The system of claim 14, wherein the unsupervised learning component clusters domains based on characteristic vectors, and marks some clusters as potential clusters for web spam detection.

16. A web spam detection method, comprising:
    segmenting data associated with a graph into clusters;
    determining one or more local neighborhoods formed in part by the clusters, each local neighborhood including vertices that contribute toward a page rank of a vertex;
    determining a characteristic vector for each vertex based on a shape of a local neighborhood of the corresponding vertex;
    clustering a plurality of vertices of each local neighborhood into one or more clusters based on the characteristic vector of each vertex; and
    marking a cluster as containing potential web spam when vertices that contribute to the page rank of each vertex in the cluster only link to each other.

17. The method of claim 16, further comprising employing supervised or unsupervised learning processes to determine the features of the local neighborhoods.

18. A computer-implemented web spam detection system, comprising the following computer components stored in a computer readable media and executable by one or more processors:
    a global graph partitioning component that divides vertices of a domain graph into clusters based at least on a strongly connected components category and a connected components category, and constructs a feature vector that contains information on which of the clusters contains each domain of the domain graph;

a learning component that implements supervised learning or unsupervised learning to output spam scores for web pages represented by the domain graph using the feature vector; and a spam propagation component that determines that a web page is a spam when a corresponding spam score of the web page is above a predetermined score threshold.

19. The computer-implemented web spam detection system of claim 18, wherein the clusters comprise:

a first cluster that includes domains that are in a largest strongly connected components category;

a second cluster that includes domains that are in a largest connected components category;

a third cluster that includes domains that are outside of the largest strongly connected components category and the largest connected components category, but with directed paths to the largest strongly connected components category;

a fourth cluster that includes domains that are outside of the largest strongly connected components category and the largest connected components category, but with directed paths to the largest connected components category; and a fifth cluster that includes domains that are outside of the first, second, third and fourth components categories.

* * * * *